(12) United States Patent
Kwon et al.

(10) Patent No.: US 11,916,717 B2
(45) Date of Patent: Feb. 27, 2024

(54) COMMUNICATION DEVICE AND CFR PROCESSING METHOD THEREOF

(71) Applicant: SOLiD, INC., Seongnam-si (KR)

(72) Inventors: Nag Won Kwon, Yongin-si (KR); Hee Cheol Yun, Seoul (KR); Hyun Soo Shin, Yongin-si (KR); Hyun Chae Kim, Seoul (KR)

(73) Assignee: SOLiD, INC., Seongnam-si (KR)

( * ) Notice: Subject to any disclaimer, the term of this patent is extended or adjusted under 35 U.S.C. 154(b) by 0 days.

(21) Appl. No.: 17/847,779

(22) Filed: Jun. 23, 2022

(65) Prior Publication Data

US 2022/0417071 A1 Dec. 29, 2022

(30) Foreign Application Priority Data

Jun. 24, 2021 (KR) .................. 10-2021-0082287

(51) Int. Cl.
| | |
|---|---|
| *H04L 27/26* | (2006.01) |
| *H04B 17/327* | (2015.01) |
| *H04B 1/04* | (2006.01) |
| *H04W 52/22* | (2009.01) |

(52) U.S. Cl.
CPC ....... *H04L 27/2623* (2013.01); *H04B 1/0475* (2013.01); *H04B 17/327* (2015.01); *H04W 52/225* (2013.01)

(58) Field of Classification Search
CPC . H04L 27/2623; H04B 17/327; H04B 1/0475; H04W 52/225
USPC ........................................ 375/262, 296, 297
See application file for complete search history.

(56) References Cited

U.S. PATENT DOCUMENTS

| | | | |
|---|---|---|---|
| 7,313,373 B1 * | 12/2007 | Laskharian | .............. H04B 1/04 455/208 |
| 10,826,739 B1 | 11/2020 | Fomin et al. | |
| 11,057,004 B2 | 7/2021 | Kim et al. | |
| 2009/0176466 A1 | 7/2009 | Hellberg et al. | |

(Continued)

FOREIGN PATENT DOCUMENTS

| | | | | |
|---|---|---|---|---|
| EP | 2800325 A2 * | 11/2014 | ......... | H04L 27/2624 |
| WO | WO-2014146235 A1 * | 9/2014 | ......... | H04L 27/2624 |
| WO | WO-2021087533 A2 * | 5/2021 | ........... | H03F 1/3241 |

OTHER PUBLICATIONS

Extended European Search Report dated Nov. 24, 2022 in European Application No. 22180729.0.

*Primary Examiner* — Emmanuel Bayard
(74) *Attorney, Agent, or Firm* — Sughrue Mion, PLLC

(57) ABSTRACT

The present disclosure relates to a method of reducing a Peak to Average Power Ratio (PAPR) in a communication device, and more particularly, to a method of Crest Factor Reduction (CFR) processing of a signal in order to reduce a PAPR in a communication device such as a repeater. The communication device includes: a first CFR module configured generate a first processed signal by CFR processing an original signal; and a second CFR module configured generate a second processed signal by CFR processing the first processed signal, wherein the first processed signal is generated using a first sampling rate, and the second processed signal is generated using a second sampling rate. According to the disclosure, even a communication device with a low sampling rate may effectively remove a peak component of an input signal.

4 Claims, 8 Drawing Sheets

(56) References Cited

U.S. PATENT DOCUMENTS

| | | | |
|---|---|---|---|
| 2013/0114761 A1* | 5/2013 | Azadet | H04L 25/02 375/296 |
| 2014/0269987 A1* | 9/2014 | Gubeskys | H04L 27/2624 375/296 |
| 2017/0187560 A1* | 6/2017 | Ng | H03F 1/3282 |
| 2017/0331650 A1* | 11/2017 | Martinez | H04L 27/2623 |
| 2018/0331871 A1* | 11/2018 | Martinez | H04W 88/085 |
| 2020/0068570 A1* | 2/2020 | Khan | H04B 1/0475 |
| 2021/0176107 A1* | 6/2021 | Hou | H03F 3/24 |
| 2021/0298027 A1* | 9/2021 | Haza | H04W 72/0453 |

* cited by examiner

FIG. 4
[2-tap Sample shifter]
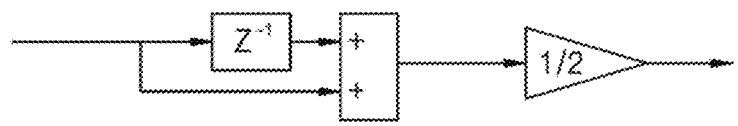
[4-tap Sample shifter]
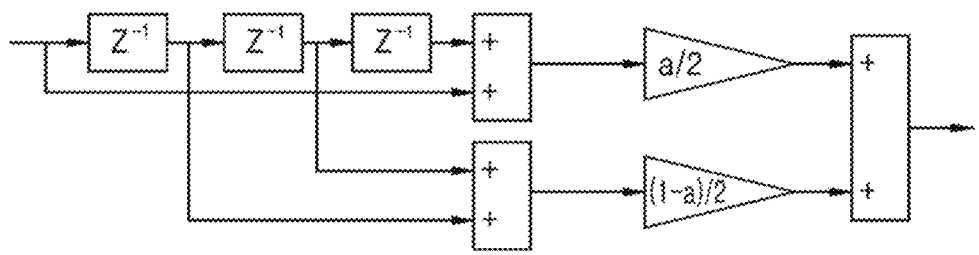
[6-tap Sample shifter]
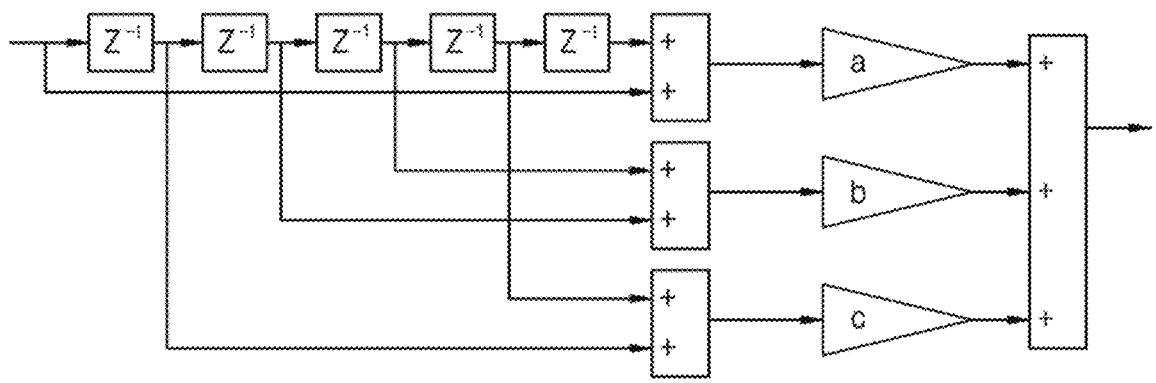
(HOWEVER, a+b+c=1/2)

COMMUNICATION DEVICE AND CFR PROCESSING METHOD THEREOF

CROSS-REFERENCE TO RELATED APPLICATION

This application claims the benefit of Korean Patent Application No. 10-2021-0082287, filed on Jun. 24, 2021, in the Korean Intellectual Property Office, the disclosure of which is incorporated herein in its entirety by reference.

BACKGROUND

1. Field

The present disclosure relates to a method of reducing a Peak to Average Power Ratio (PAPR) in a communication device, and more particularly, to a method of Crest Factor Reduction (CFR) processing of a signal in order to reduce a PAPR in a communication device such as a repeater.

2. Description of the Related Art

A repeater is an electronic device that receives a signal and retransmits the signal at a higher level or higher power. A signal used by the repeater often has a high PAPR. This causes a problem that limits the efficiency of a power amplifier implemented in the repeater. Therefore, in order to increase the efficiency of the power amplifier, various PAPR reduction methods have been proposed.

Crest Factor Reduction (CFR) is one of those methods. CFR samples an input signal, detects a peak value of the sampled signal, and compares the peak value with a preset threshold. When the peak value exceeds the threshold, the peak value is reduced by the excess amount to make the peak value of the signal less than or equal to the set threshold.

According to the conventional CFR method, if the position of a peak of the input signal (a magnitude peak) does not coincide with sampling timing, an accurate peak value cannot be estimated. In this case, there is a problem in that a peak portion of the signal is not sufficiently removed, so that a peak component exceeding the threshold remains.

In general, to solve this problem, a multistage CFR method in which a first CFR-processed signal is passed through a CFR block having an identical configuration once or more than once to reduce the magnitude of the remaining peak signal may be used. However, this method also cannot be effective when a sampling position and a peak position do not match. By increasing a sampling rate, the sampling position and the peak position may be matched. However, if the sampling rate is increased, the multistage CFR method cannot be implemented due to the processing speed limit of a field programmable gate array (FPGA), or there is a concern that a high-end FPGA needs to be used due to an excessive increase in the logic capacity of the FPGA.

SUMMARY

Provided are a communication device capable of effectively removing a peak component of a signal even at a low sampling rate, and a CFR processing method thereof.

Additional aspects will be set forth in part in the description which follows and, in part, will be apparent from the description, or may be learned by practice of the presented embodiments.

According to an aspect of an embodiment, a communication device includes a first CFR module configured to generate a first processed signal by CFR processing an original signal, and a second CFR module configured to generate a second processed signal by CFR processing the first processed signal, the first processed signal is generated using a first sampling rate, and the second processed signal is generated using a second sampling rate.

According to an exemplary embodiment, the second CFR module generates the second processed signal by CFR processing the first processed signal based on a time different from that of the first CFR module, and the first sampling rate is set equal to the second sampling rate.

According to an exemplary embodiment, the communication device further includes a sample shifter configured to shift and output the first processed signal by a preset time, the second CFR module generates the second processed signal by CFR processing a signal input from the sample shifter.

According to an exemplary embodiment, the preset time corresponds to less than the first sampling rate.

According to an exemplary embodiment, the preset time corresponds to half of the first sampling rate.

According to an aspect of another embodiment, a method of CFR processing an original signal in a communication device including a plurality of CFR modules includes generating a first processed signal by CFR processing the original signal; and generating a second processed signal by CFR processing the first processed signal, the first processed signal is generated using a first sampling rate, and the second processed signal is generated using a second sampling rate.

According to an exemplary embodiment, the generating of the second processed signal includes generating the second processed signal by CFR processing the first processed signal based on a time different from that of the first CFR module, and the first sampling rate is set equal to the second sampling rate.

According to an exemplary embodiment, the method further includes outputting the first processed signal by shifting by a preset time, the generating of the second processed signal comprises generating the second processed signal by CFR processing the shifted first processed signal.

BRIEF DESCRIPTION OF THE DRAWINGS

These and/or other aspects will become apparent and more readily appreciated from the following description of the embodiments, taken in conjunction with the accompanying drawings in which:

FIG. 4 is an exemplary diagram of a configuration of a sample shifter according to an embodiment;

DETAILED DESCRIPTION

Figure 1:
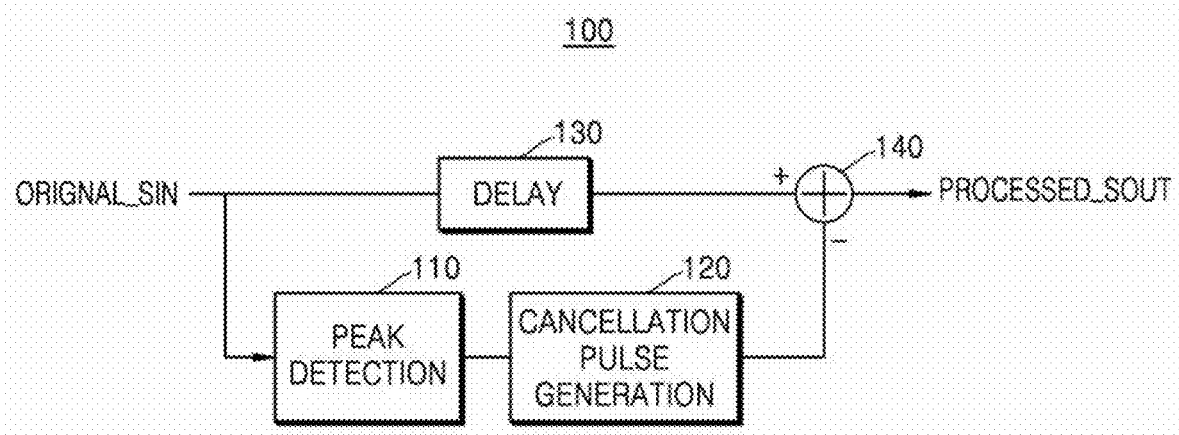
FIG. 1 is a functional block diagram of a general Crest Factor Reduction (CFR) module.

Since the disclosure may have diverse modified embodiments, preferred embodiments are illustrated in the drawings and are described in the detailed description. However, this is not intended to limit the disclosure to particular modes of practice, and it is to be appreciated that all changes, equivalents, and substitutes that do not depart from the spirit and technical scope of the disclosure are encompassed in the disclosure.

In the description of the disclosure, certain detailed explanations of the related art are omitted when it is deemed that they may unnecessarily obscure the essence of the disclosure. In addition, numeral figures (e.g., first, second, and the like) used during describing the specification are just identification symbols for distinguishing one element from another element.

Further, in the specification, if it is described that one component "is connected to" or "accesses" the other component, it is understood that the one component may be directly connected to or may directly access the other component but unless explicitly described to the contrary, another component may be "connected" or "access" between the components.

In addition, terms including "unit," "er," "or," "module," and the like disclosed in the specification mean a unit that processes at least one function or operation and this may be implemented by hardware or software such as a processor, a micro processor, a micro controller, a central processing unit (CPU), a graphics processing unit (GPU), an accelerated Processing unit (APU), a digital signal processor (DSP), an application specific integrated circuit (ASIC), and a field programmable gate array (FPGA) or a combination of hardware and software.

In addition, it is intended to clarify that the division of the components in the specification is only made for each main function that each component is responsible for. That is, two or more components to be described later below may be combined into one component, or one components may be divided into two or more components according to more subdivided functions. In addition, it goes without saying that each of the components to be described later below may additionally perform some or all of the functions of other components in addition to its own main function, and some of the main functions that each of the components is responsible for may be dedicated and performed by other components.

Hereinafter, various embodiments will be described in detail in order.

FIG. 1 is a functional block diagram of a general Crest Factor Reduction (CFR) module.

Referring to FIG. 1, a CFR module 100 is a configuration for reducing the size of a component (peak) greater than a preset threshold in an input signal (hereinafter referred to as an 'original signal'), and may input a peak detector (PEAK DETECTION) 110, a cancellation pulse generator (CANCELLATION PULSE GENERATION) 120, and a delay (DELAY) 130.

The peak detector 110 may detect a peak by receiving the magnitude of the original signal. For example, the peak detector may calculate a change value of a signal magnitude between samples and determine a point where a sign of the value changes from positive to negative as a peak. The peak detector, when the size of the detected peak is greater than a certain threshold, may obtain a difference value between the peak and the threshold.

The cancellation pulse generator 120 may generate a cancellation pulse corresponding to the peak detected by the peak detector 110 and the original signal and may output the cancellation pulse to a subtracter 140.

The delay 130 may synchronize the original signal with the cancellation pulse by delaying the original signal (except for some input to the peak detector 110) in response to a delay time required while the peak detector 110 and the cancellation pulse generator 120 perform the above operations.

The subtracter 140 may combine the original signal input from the delay 130 and the cancellation pulse input from the cancellation pulse generator 120 to output a 'signal from which a portion having a signal magnitude greater than or equal to the threshold is removed' (hereinafter referred to as a 'processed signal').

Because the operation of the CFR module 100 described above is a previously disclosed technology, a more detailed description thereof will be omitted. In addition, it is obvious that the operation of the CFR module 100 described above is only an example, and the scope of the disclosure is not limited to the operation. In addition, hereinafter, an operation of outputting a processed signal by removing a peak of an original signal from the CFR module 100 is abbreviated as 'CFR processing'.

The disclosure includes a configuration for performing CFR processing multiple times, and in particular, a unique 'sample shift operation' (a specific operation for this will be described later) is performed between each CFR processing. Hereinafter, CFR processing of an original signal according to an embodiment will be described with reference to FIGS. 2 and 3.

Figure 2:
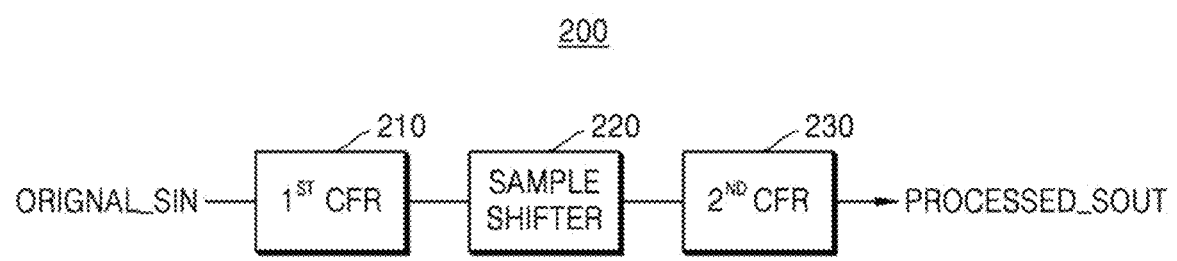
FIGS. 2 and 3 are block diagrams of a CFR processing unit according to an embodiment.
Figure 3:
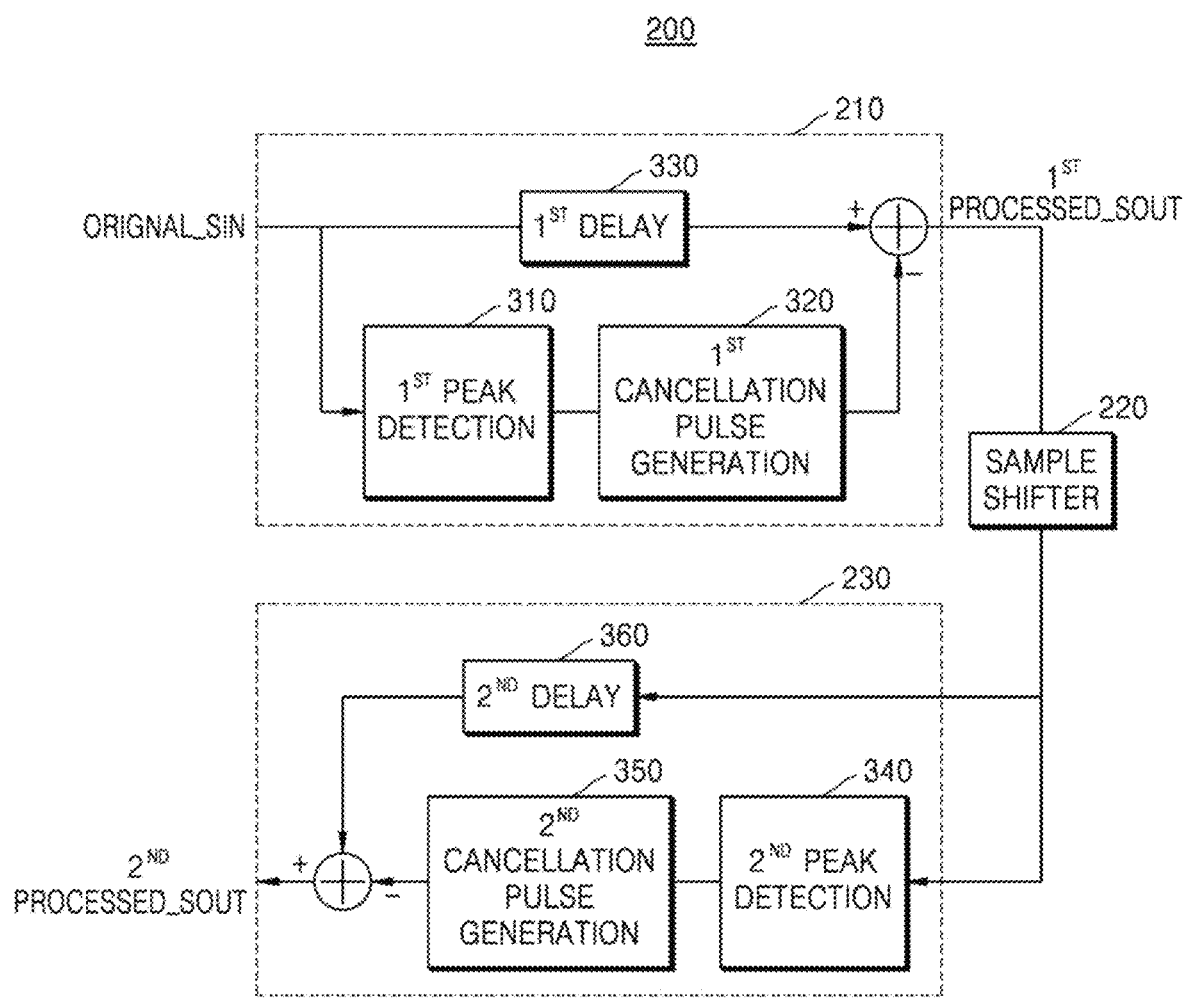

FIGS. 2 and 3 are block diagrams of a CFR processing unit according to an embodiment.

Referring to FIG. 2, a communication device 200 according to an embodiment may include a first CFR module ($1^{st}$ CFR) 210, a sample shifter (SAMPLE SHIFTER) 220, and a second CFR module ($2^{nd}$ CFR) 230.

When an original signal is input, the first CFR module 210 may detect a peak of the original signal using a preset first sampling rate, and may generate a pulse corresponding to the detected peak to primarily remove the peak of the original signal.

The sample shifter 220 may shift or phase-delay an input signal by a preset time. A signal output from the first CFR module 210 may be input to the second CFR module 230 after being shifted or phase-delayed through the sample shifter 220.

When the shifted or phase-delayed signal is input from the sample shifter 220, the second CFR module 230 may detect a peak using a preset second sampling rate, and may generate a pulse corresponding to the detected peak to secondarily remove the peak of the original signal.

The operation of the second CFR module 230 is similar to that of the first CFR module 210, but sampling timing is different. This is because the signal input to the second CFR module 230 is the signal input from the sample shifter 220. Accordingly, even if the first sampling rate and the second sampling rate are the same, positions of original signals sampled by the first CFR module 210 and the second CFR module 230 may be different from each other.

In FIG. 3, a detailed configuration of the first CFR module 210, the sample shifter 220, and the second CFR module 230 of the communication device 200 according to an embodiment is illustrated.

That is, the first CFR module 210 may include a first peak detector ($1^{st}$ PEAK DETECTION) 310, a first cancellation pulse generator ($1^{st}$ CANCELLATION PULSE GENERATION) 320, and a first delay ($1^{st}$ DELAY) 330.

The first CFR module 210 may sample an input original signal at a first sampling rate, detect a peak, generate a cancellation pulse to control the peak, and then output a first processed signal.

A first processed signal may be input to the sample shifter 220. The sample shifter 220 may shift or phase-delay the first processed signal for a preset time and output the first processed signal. The preset time is shorter than the period of the first sampling rate, and may correspond to, for example, half the period of the first sampling rate. The sample shifter 220 may be implemented using an FIR filter composed of a plurality of taps, and the number of FIR filter taps may vary according to the ratio of a bandwidth of the original signal to a sampling rate. In addition, FIR filter coefficients may be set so that frequency characteristics of a filter are uniform over the entire signal band so that the original signal is not distorted in a spectrum and has a mutually symmetrical value. Accordingly, as the bandwidth of the original signal is greater, the frequency characteristics needs to be maintained in a wider frequency band, so an FIR filter having a larger number of taps will be required.

Examples of configurations for implementing the function of the sample shifter 220 are shown in FIG. 4. Since the configuration of the sample shifter 220 may vary other than the examples of FIG. 4, it is obvious that any one configuration of the sample shifter 220 cannot limit the scope of the disclosure.

The second CFR module 230 may include a second peak detector 340 ($2^{nd}$ PEAK DETECTION), a second cancellation pulse generator 350 ($2^{nd}$ CANCELLATION PULSE GENERATION), and a second delay 360 ($2^{nd}$ DELAY).

A signal processed by the sample shifter 220 may be input to the second CFR module 230. The second CFR module 230 may sample the input signal at a second sampling rate, detect a peak, generate a cancellation pulse to control the peak, and then output a second processed signal.

The signal input to the second CFR module 230 is a signal shifted or phase-delayed by the sample shifter 220. Thus, even if the first sampling rate and the second sampling rate are the same, the position of an original signal sampled by the second peak detector 340 may be different from the position of an original signal sampled by the first peak detector 310.

With this configuration, the communication device 200 according to the disclosure may effectively remove a peak component of the original signal even at a low sampling rate. Hereinafter, a result of removing the peak component according to the disclosure will be described with reference to FIGS. 4 to 6.

Figure 5:
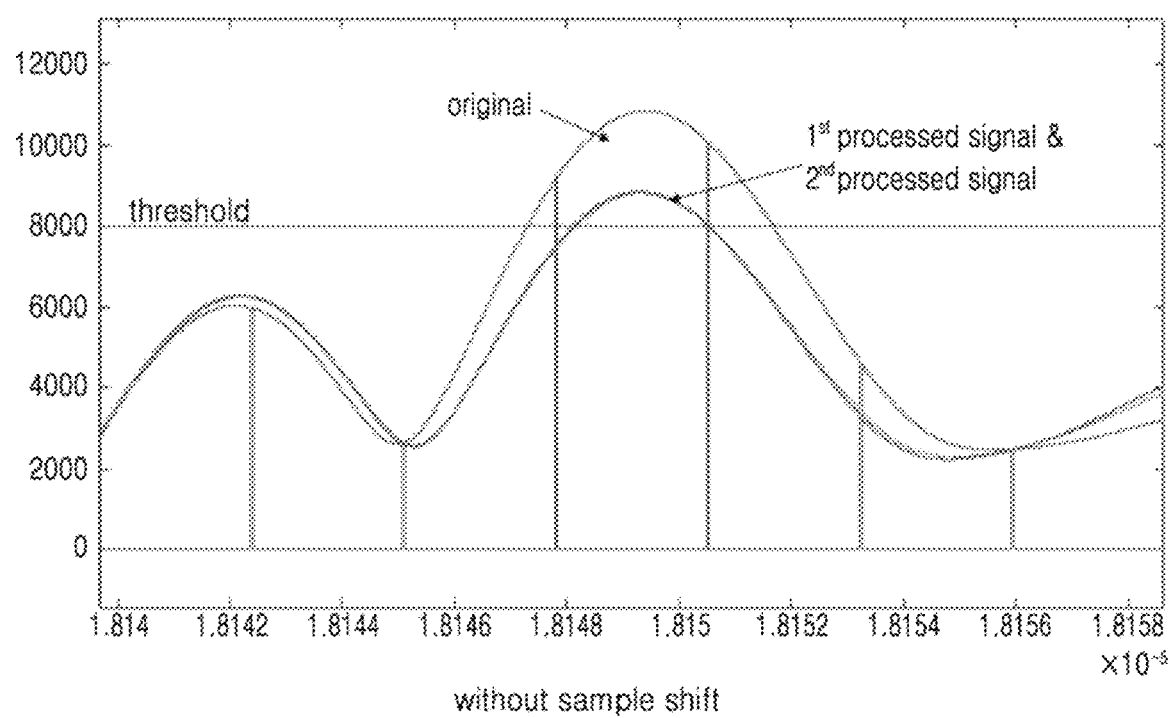
FIG. 5 is a graph illustrating a result of removing a signal peak using a plurality of CFR modules without a sample shifter.
Figure 6:
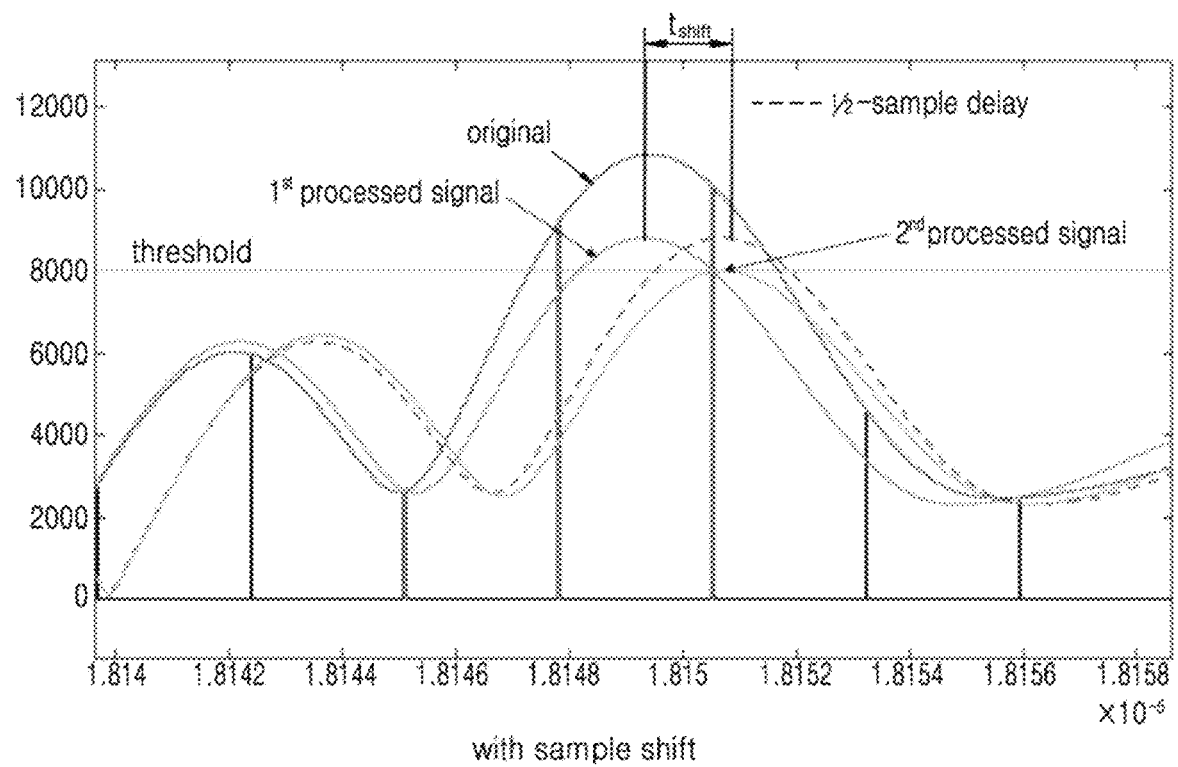
FIG. 6 is a graph illustrating a signal processing result processed by a CFR processing unit according to an embodiment.

FIG. 5 is a graph illustrating a result of removing a signal peak using a plurality of CFR modules without a sample shifter, and FIG. 6 is a graph illustrating a signal processing result processed by a CFR processing unit according to an embodiment.

Referring to FIG. 5, a case in which the peak component of the original signal is removed only with the first CFR module 210 and the second CFR module 230 without the sample shifter 220 is exemplified. As shown in FIG. 5, in the absence of the sample shifter 220, a peak portion detected by the first CFR module 210 and a peak portion detected by the second CFR module 230 may be similar to each other, and a residual peak that is not removed by the first CFR module 210 may not be completely removed from the second CFR module 230. Accordingly, even after the peak is removed from the first CFR module 210 and the second CFR module 230, a component exceeding a preset threshold may remain.

However, referring to FIG. 6, a case in which the peak component of the original signal is removed by using the first CFR module 210, the sample shifter 220, and the second CFR module 230 is exemplified. The sample shifter 220 may shift or phase-delay a first processed signal by a preset time $t_{shift}$. For example, when a first sampling rate and a second sampling rate are the same, the preset time $t_{shift}$ may be a value corresponding to half of the first sample rate. Thus, a peak portion detected by the first CFR module 210 and a peak portion detected by the second CFR module 230 may be completely different from each other. Accordingly, it can be seen that the remaining peak portion not removed by a first processed signal is completely removed through the second CFR module 230. Unlike in FIG. 5, it can be seen that there is no component exceeding a threshold in a second processed signal of FIG. 6.

Figure 7:
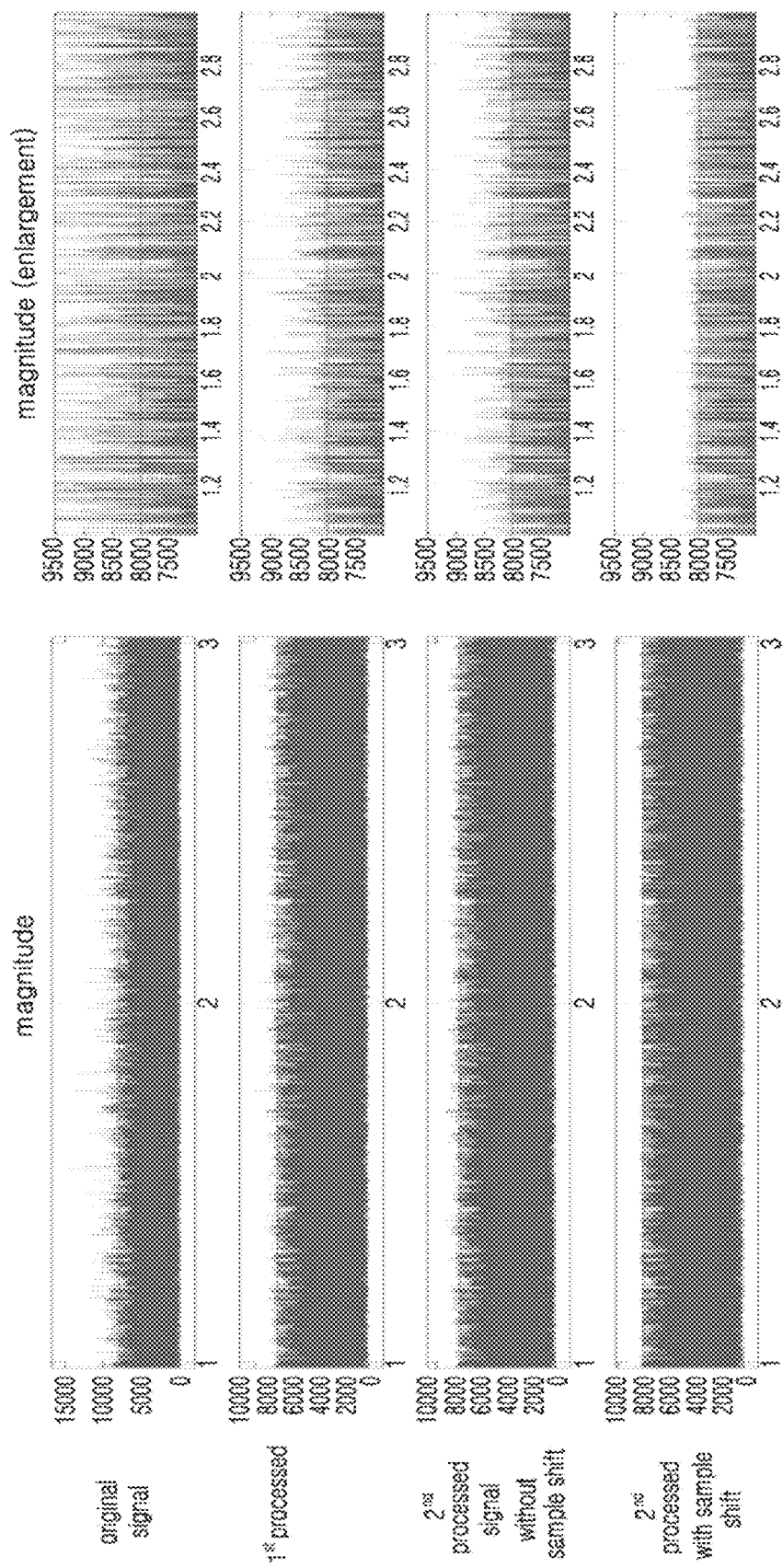
FIG. 7 is a graph comparing amplitudes of an original signal, a first CFR processed signal, a second CFR processed signal, and a signal processed according to the disclosure.

FIG. 7 is a graph comparing amplitudes of an original signal, a first CFR processed signal, a second CFR processed signal, and a signal processed according to the disclosure.

Referring to FIG. 7, it can be seen that a significant amount of a component exceeding a threshold of the original signal (original) has been removed from a first processed signal ($1^{st}$ processed), but a component exceeding the threshold still exists.

In addition, when second CFR processing is performed immediately after first CFR processing without the sample shifter 220 of the disclosure, it can be seen that a component exceeding the threshold still exists in a second processed signal ($2^{nd}$ processed without sample shift).

On the other hand, when the second CFR processing is performed after shifting or phase-delaying the first processed signal in the sample shifter 220 of the disclosure, It can be seen that the component exceeding the threshold is almost removed from a second processed signal ($2^{nd}$ processed with sample shift).

Figure 8:
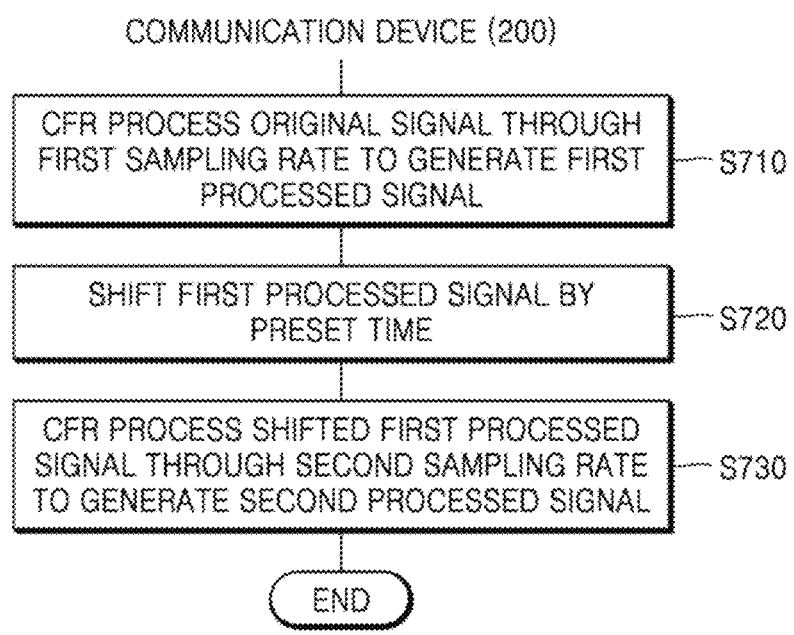
FIG. 8 is a flowchart illustrating a CFR processing method according to an embodiment.

FIG. 8 is a flowchart illustrating a CFR processing method according to an embodiment.

Hereinafter, a CFR processing method according to an embodiment will be described with reference to FIG. 8. Each of the operations to be described below is an operation performed in each configuration of the communication device 200 described with reference to FIGS. 2 and 3, the first CFR module 210, the sample shifter 220 and the second CFR module 230, but is collectively described as being performed in the communication device 200 for convenience of understanding and description.

In operation S710, the communication device 200 may sample an original signal according to a preset first sampling rate and then detect a peak portion after comparing the magnitude of the sampled signal with a threshold, and may perform CFR processing to remove the detected peak portion. A first CFR-processed signal in this operation is referred to as a first processed signal.

In operation S720, the communication device 200 may shift or phase-delay the first processed signal by a preset time $t_{shift}$. The preset time $t_{shift}$ may be a value corresponding to half of a first sampling rate. In addition, specific configurations for shifting or phase-delaying the first processed signal may vary, and detailed description thereof will be omitted.

In operation S730, the communication device 200 may sample the shifted or phase-delayed first processed signal according to a preset second sampling rate and then detect a peak portion after comparing the magnitude of the sampled signal with a threshold, and may perform second CFR processing to remove the detected peak portion. A second CFR-processed signal in this operation is referred to as a second processed signal.

The second sampling rate may be the same as the first sampling rate. Because the shifted or phase-delayed first processed signal is input, even if the second sampling rate is sampled with the same value as the first sampling rate, the sampled positions will be different from each other. Therefore, according to the disclosure, even if the first sampling rate and/or the second sampling rate is low, a peak component of the signal may be effectively removed, and FPGA LOGIC may be implemented with a low clock.

A communication device and a CFR processing method thereof according to the disclosure may effectively remove a peak component exceeding a threshold in a signal even at a low sampling rate.

In addition, the communication device and the CFR processing method thereof according to the disclosure may effectively reduce a Peak to Average Power Ratio (PAPR) even with FPGA LOGIC operating at a low clock.

Effects obtainable by the embodiments of the inventive concept are not limited to the effects described above, and other effects not described herein may be clearly understood by one of ordinary skill in the art to which the inventive concept belongs from the following description.

While the embodiments have been particularly shown and described, it will be understood by one of ordinary skill in the art that various changes in form and details may be made therein without departing from the spirit and scope of the disclosure as defined by the appended claims.

What is claimed is:

1. A communication device comprising:
   a first crest factor reduction (CFR) module configured to generate a first processed signal by CFR processing an original signal;
   a sample shifter configured to shift and output the first processed signal by a half of a period of a first sampling rate; and
   a second CFR module configured to generate a second processed signal by CFR processing the shifted signal input from the sample shifter.

2. The communication device of claim 1,
   wherein the first processed signal is generated using the first sampling rate,
   wherein the second processed signal is generated using a second sampling rate,
   wherein the second CFR module generates the second processed signal by CFR processing the first processed signal based on a time different from that of the first CFR module, and
   wherein the first sampling rate is set equal to the second sampling rate.

3. A method of crest factor reduction (CFR) processing an original signal in a communication device including a plurality of CFR modules, the method comprising:
   generating a first processed signal by CFR processing the original signal;
   shifting and outputting the first processed signal by a half of a period of a first sampling rate; and
   generating a second processed signal by CFR processing the shifted first processed signal.

4. The method of claim 3, wherein the generating of the second processed signal comprises:
   generating the second processed signal by CFR processing the first processed signal based on a time different from that of the first CFR module,
   wherein the first processed signal is generated using the first sampling rate,
   wherein the second processed signal is generated using a second sampling rate, and
   wherein the first sampling rate is set equal to the second sampling rate.

* * * * *